Sept. 10, 1929.	E. G. ASHCRAFT	1,727,361
ARC LIGHT
Filed Nov. 19, 1926	8 Sheets-Sheet 1
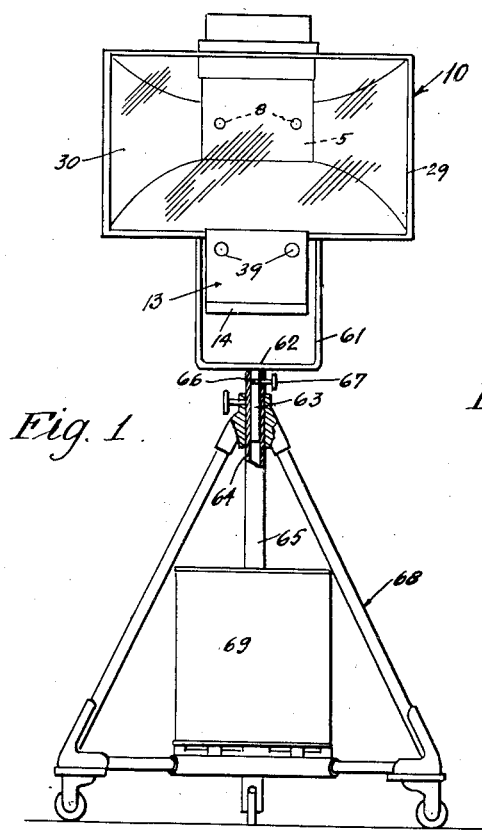
Fig. 1.
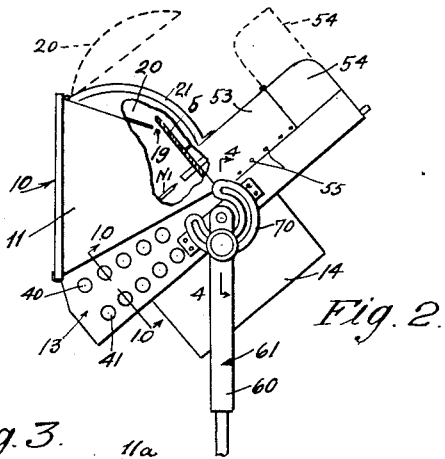
Fig. 2.
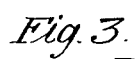
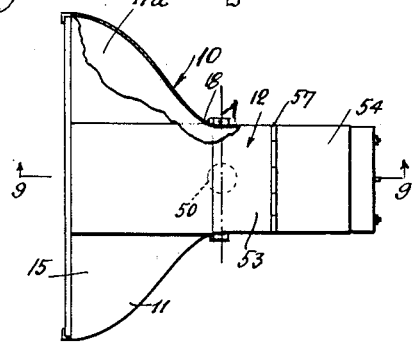
Fig. 3.
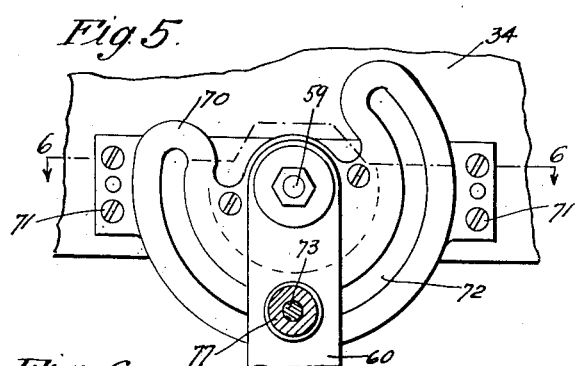
Fig. 4.
Fig. 5.
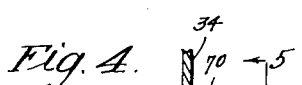
Fig. 6.
Inventor
Ernest G. Ashcraft.
Attorney.

Sept. 10, 1929.  E. G. ASHCRAFT  1,727,361
ARC LIGHT
Filed Nov. 19, 1926  8 Sheets-Sheet 2
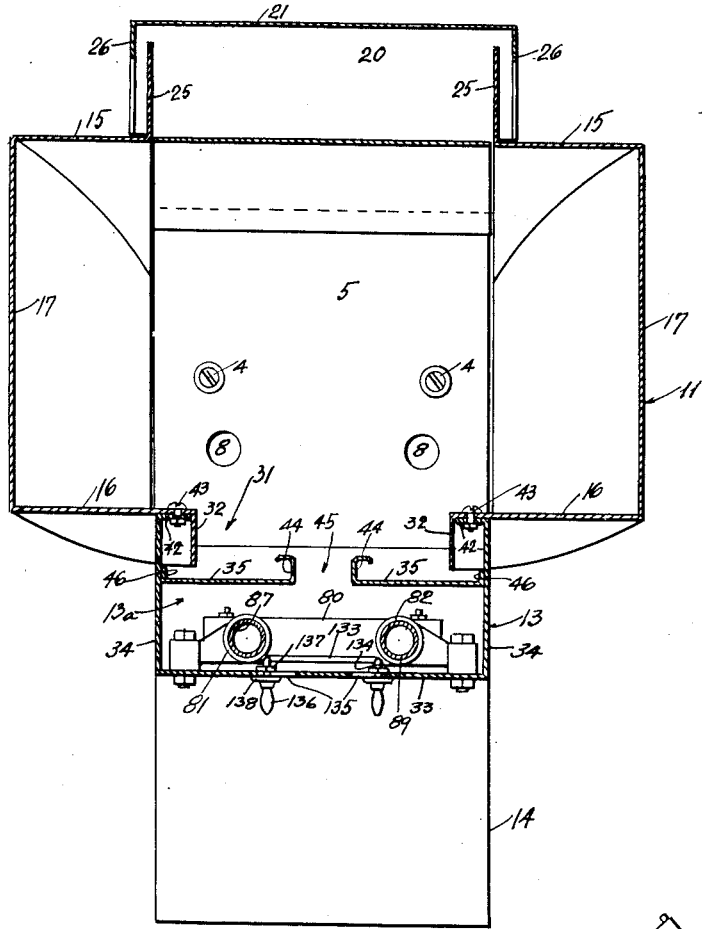
Fig. 12
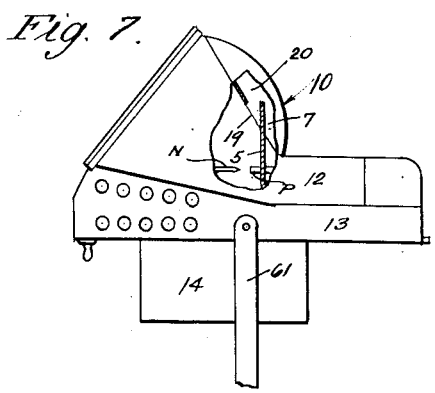
Fig. 7
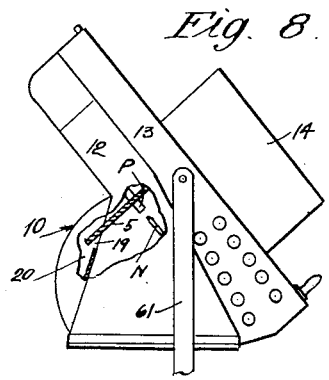
Fig. 8
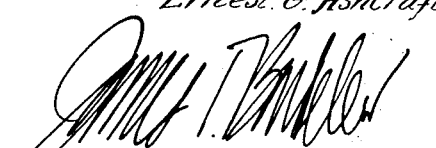
Inventor
Ernest G. Ashcraft.
Attorney.

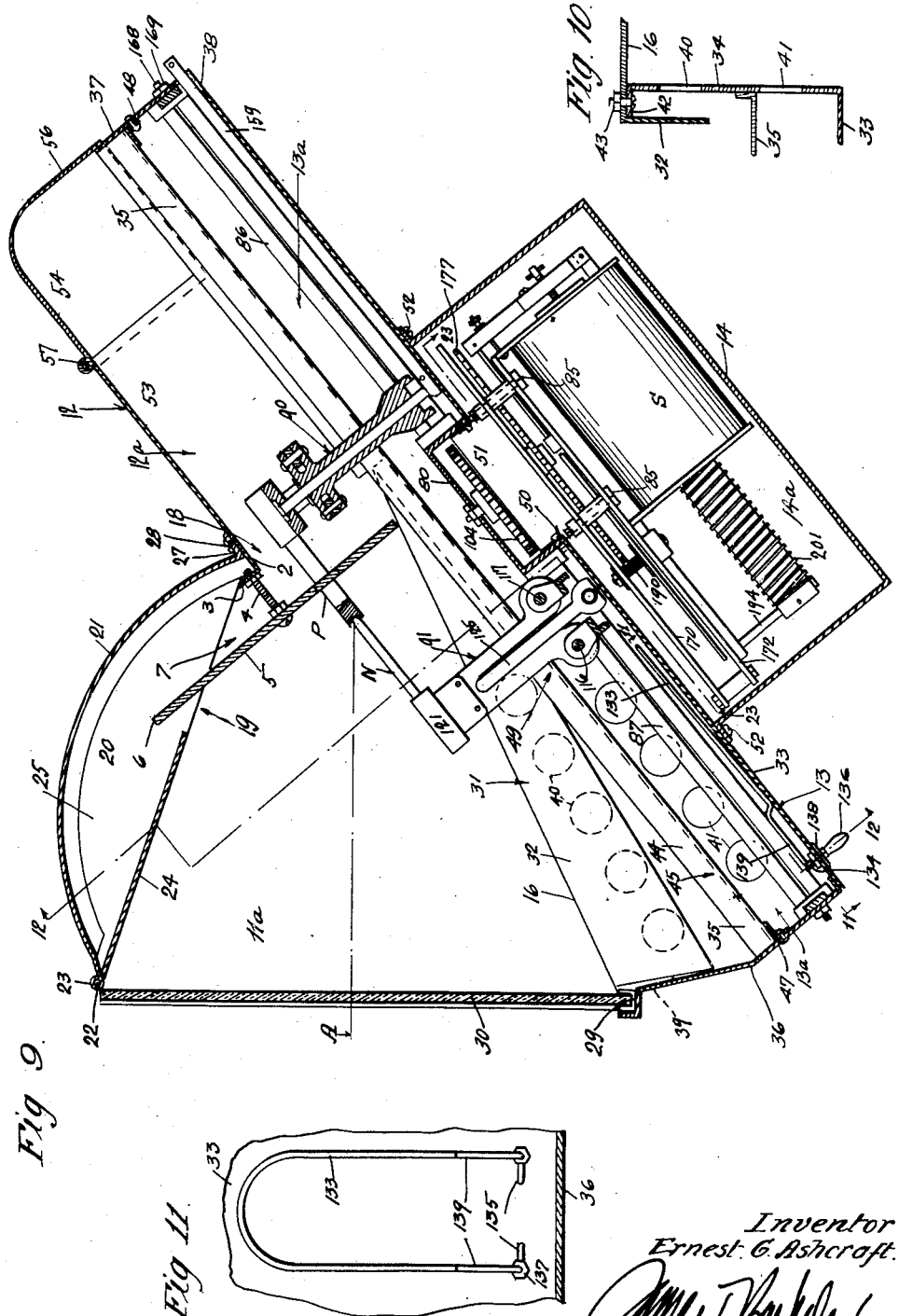

Sept. 10, 1929.  E. G. ASHCRAFT  1,727,361
ARC LIGHT
Filed Nov. 19, 1926   8 Sheets-Sheet 4
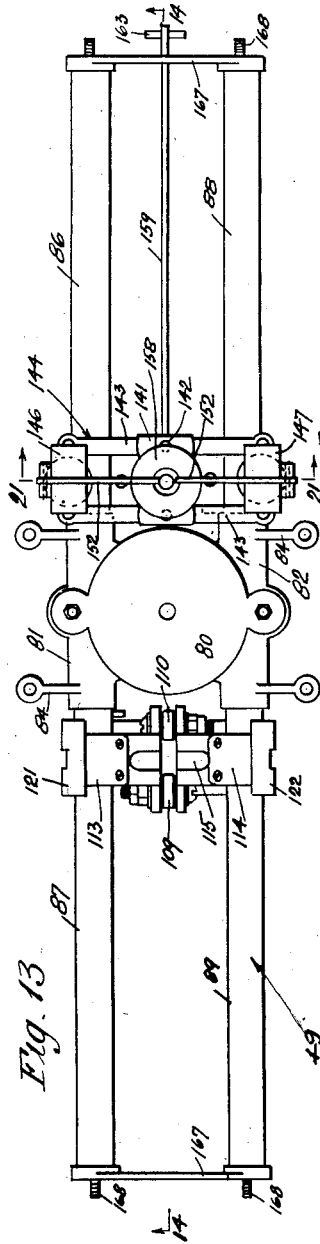
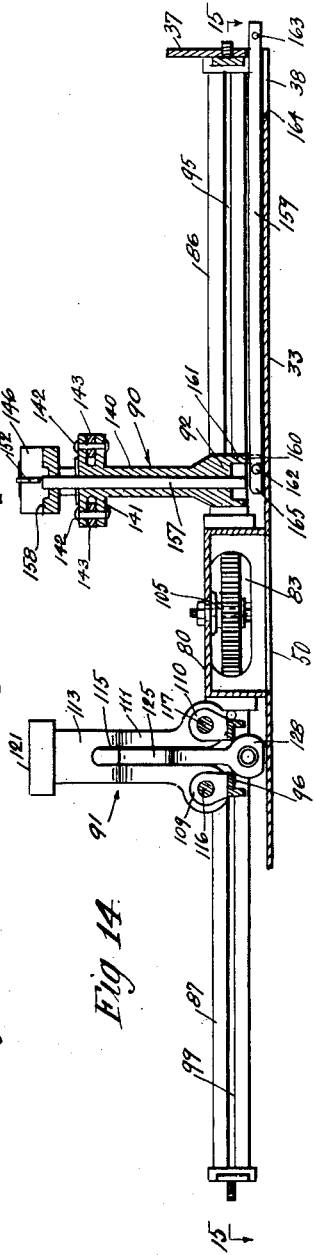
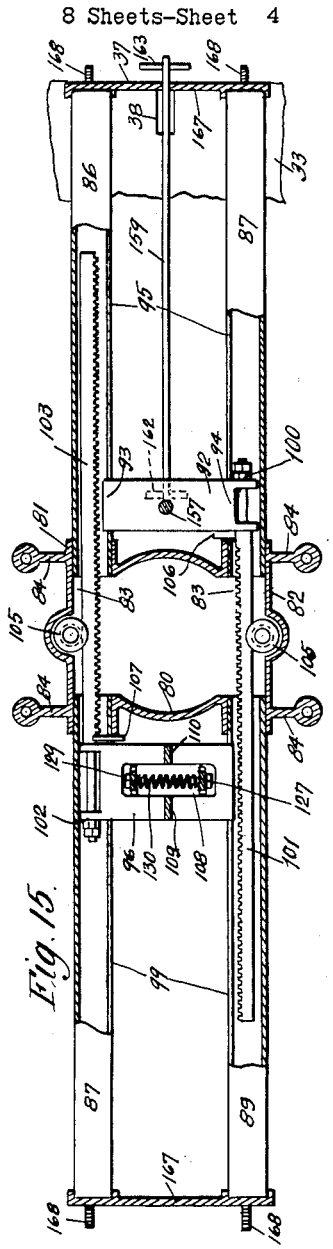
*Inventor*
*Ernest G. Ashcraft*
*Attorney*

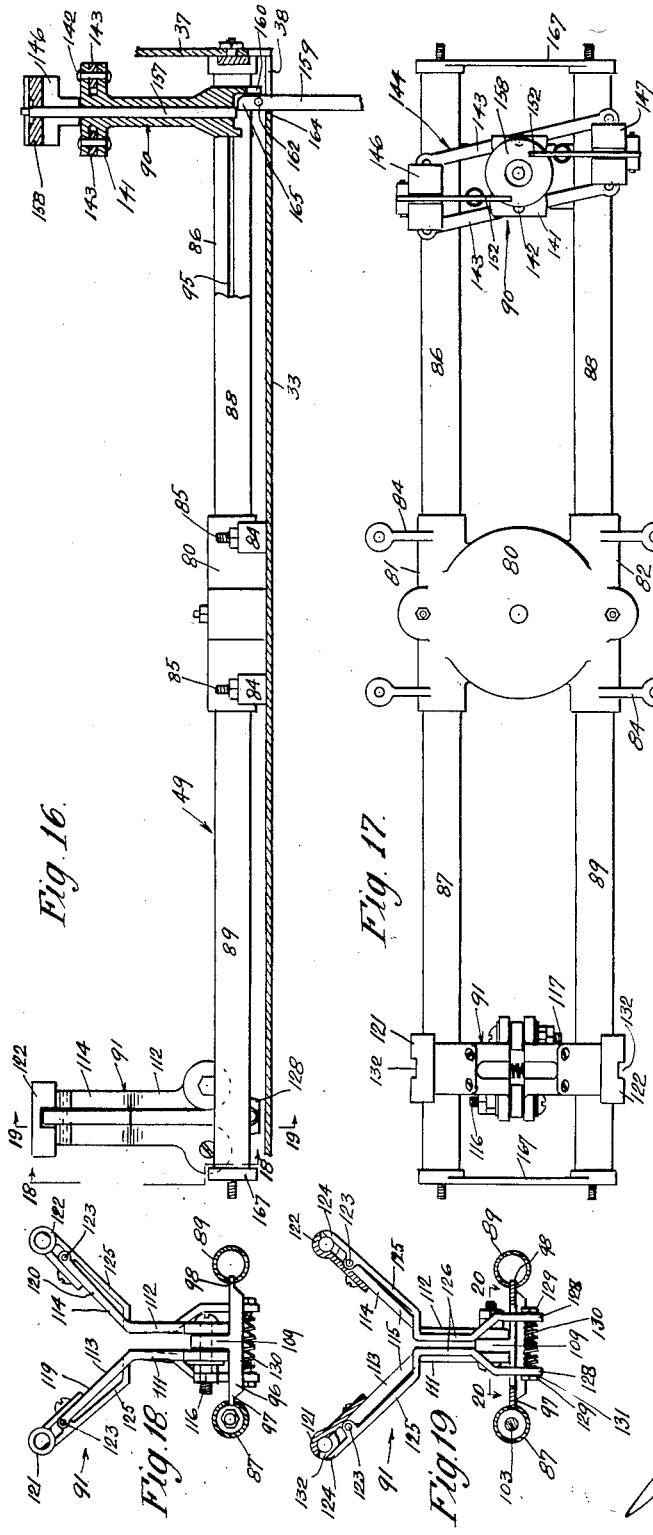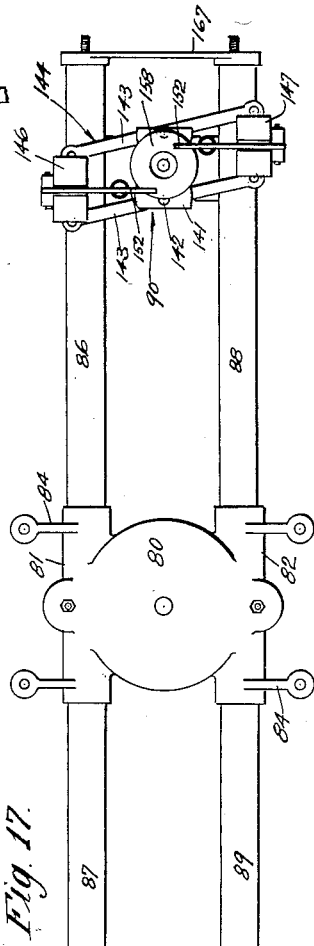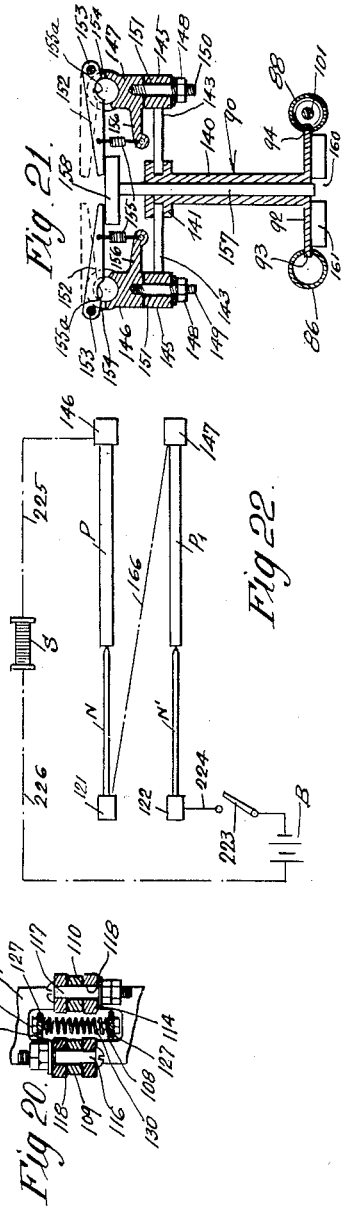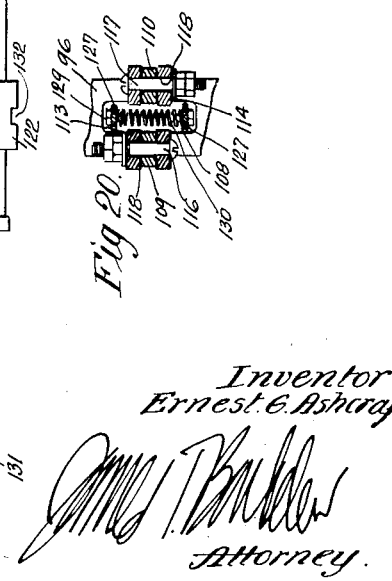

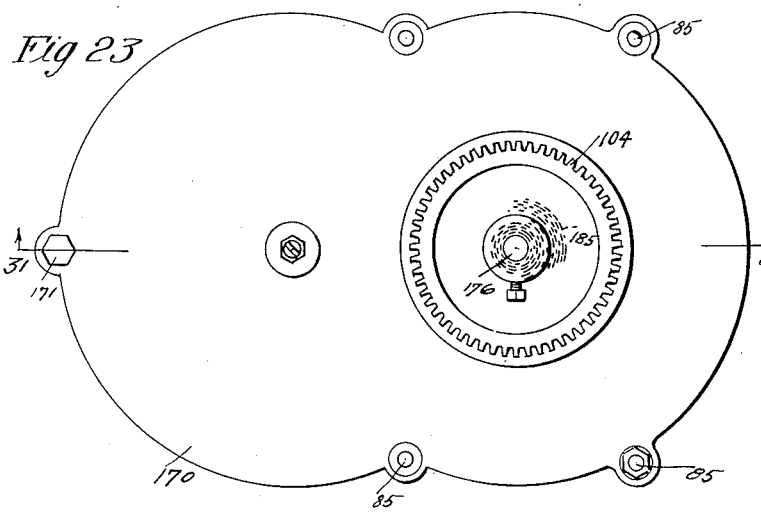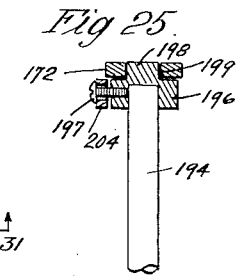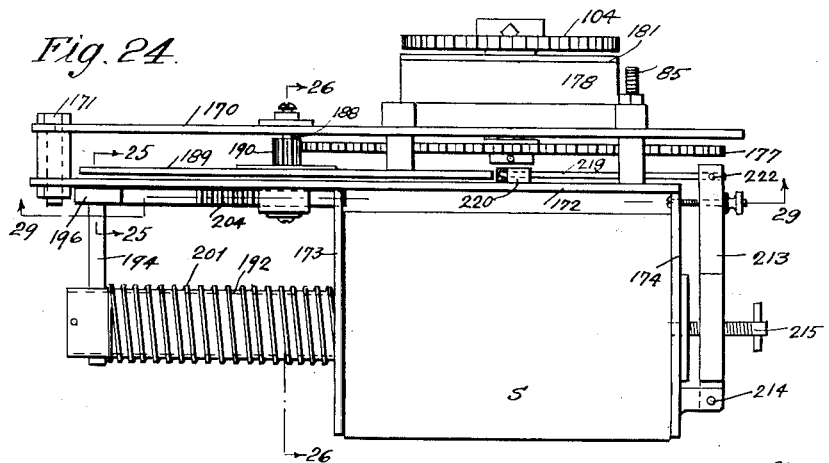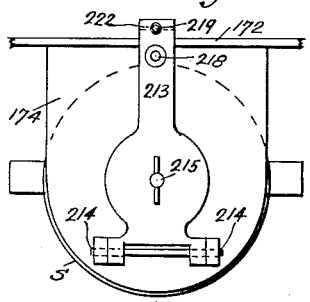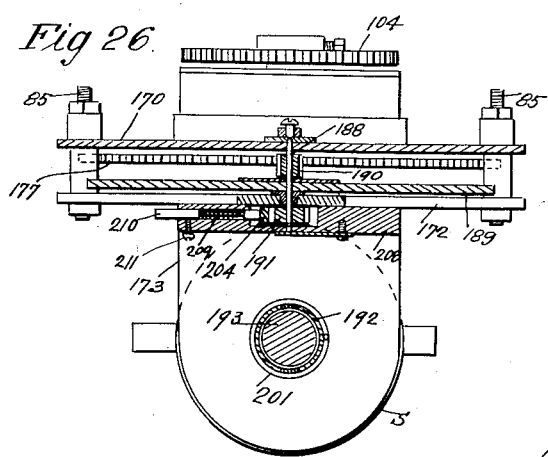

Sept. 10, 1929.　　E. G. ASHCRAFT　　1,727,361
ARC LIGHT
Filed Nov. 19, 1926　　8 Sheets-Sheet 7

Inventor.
Ernest G. Ashcraft.

Attorney.

Sept. 10, 1929.  E. G. ASHCRAFT  1,727,361
ARC LIGHT
Filed Nov. 19, 1926   8 Sheets-Sheet 8

Inventor
Ernest G. Ashcraft.

Attorney.

Patented Sept. 10, 1929.

1,727,361

UNITED STATES PATENT OFFICE.

ERNEST G. ASHCRAFT, OF LOS ANGELES, CALIFORNIA.

ARC LIGHT.

Application filed November 19, 1926. Serial No. 149,351.

This invention has to do generally with arc lights, and since one of the most prevalent uses of arc lights is in connection with the illuumination of scenes in the taking of motion pictures, I will describe the invention as embodied in a light especially adapted to this particular use, though this is in no way to be considered as limitative on the invention. A further reason for describing the invention as applied to a light put to this particular use is that certain conditions exist in the illuminating of scenes for the purpose of taking pictures which are not met in street lighting, etc., and my invention most effectively meets these conditions.

My light has many features of advantage in connection with the construction of the housing structure, the carbon-feed mechanism and the combination of the two, and while such features contribute collectively to the general, high efficiency of the light, many of the features are individually novel and advantageous in themselves, and therefore made the subject-matter of individual claims. For instance, while a housing made in accordance with the showing and used in connection with the carbons mounted and fed in the particular manner specified, gives a novel combination of particularly high efficiency, the housing may be used to advantage with carbons arranged differently than in the manner specified, or the carbon arrangement and carbon feed may be used individually to advantage with other types of housings.

Generally, I may set forth the purpose of the invention as the provision of a light which is superior as regards economy of carbon consumption, adaptability to various situations and uses such as, over-head, "broadside" or upwardly directed illumination without appreciable lowering of efficiency; the steadiness or stableness of arc, and noiselessness of operation remaining practically unaffected.

In order to point out certain features of advantage, attention will be called to shortcomings of prior lights. but this is not done in the spirit of derogation, but merely that the invention's advance of the art may be clearly indicated.

Neither here nor in the detailed specifications will an attempt be made to discuss exhaustively all of the many features of the light, for certain features will be self-evident on the showing to those skilled in the art, and others will be immediately made known to users of the lamp. However, I will discuss below certain of the more important features.

In arc lamps that have gone before, the carbons are ordinarily gripped at points considerably spaced from their butt ends by clutch mechanisms which inherently must move longitudinally of the carbon during operation and which necessarily are of considerable bulk. These conditions necessitate replacement or "trimming" of carbons before they have been consumed to any great extent, especially in view of the fact that they must be renewed before there is any danger of the holders coming so close to the arc as to cause their fusing or burning. In contradistinction to this, my carbon holders grasp the carbons at their butt ends only, and the carbons may therefore be consumed almost entirely before they need be replaced; and I provide stop means for preventing the carriers from coming so close together so as to endanger their being burned by the arc.

In most prior lights, one of the carbons is fed automatically and the other advanced manually, it following that frequent manual adjustment and hence shutting-down of the light is required, to obvious disadvantage. Even such lights as have automatic feed for both carbons necessarily have such short effective automatic feeds and the carbons are engaged by mechanism at such distant points from their butt ends, that frequent manual trimming must be accomplished. These conditions are disadvantageous not only in that they necessitate great loss of time and comparatively frequent interruption of the photographing of the illuminated scene, but also lead to waste of carbon and frequent "striking" of the arc with its accompanying noise. This is for the reason that in preparing to photograph a given scene, it is essential that the illumination remain steady during the taking of that scene and to be absolutely positive that there is sufficient carbon to last throughout the period, the operators often discard carbon stubs which have much useful life left and replace them with full length carbons. Also to insure proper feed and a stable arc throughout the taking of the scene, it is customary for the operator to "strike" his lights just before the taking of the scene and this must be done innumerable times during a work day.

The uneven feed accomplished by most of these lights also causes flickering arcs, "batting" and hissing, though there are factors other than uneven feed that aggravate these conditions, which are most undesirable, as is well understood by those skilled in the art.

My device is such that carbons of comparatively great initial length may be used and fed together constantly at proper speed to maintain a stable arc so, from the time it is turned on, the light may burn continuously, steadily and noiselessly, until the carbons are practically consumed. Actual tests show that whereas the ordinary light of given size and consuming a given amount of current, requires carbon replacement about every forty minutes and must be struck at least once for each new "shot", a corresponding light made in accordance with my invention will burn continuously and steadily without manual adjustment, trimming or striking for fully three and one-half hours and has vastly superior illuminating qualities.

The carbon holding and feeding arrangement may be described generally as a pair of holders or carriages preferably movable towards and away from each other through strokes of equal length, (though "double" movement of the holders is not essential to the invention, considered in its broader aspects), means for moving the holders together, and means for controlling the movement giving means so the carbons are fed together at just such a speed as will maintain the arcs steadily at predetermined brilliance.

As a particular feature, though this is not limitative on the invention, I have proportioned the two holders with their carbons so they are of substantially equal weight, and have positioned them so they counterbalance one another, this being of great advantage in that the light may be tilted in any direction without disturbing this balance and therefore without disturbing the balance and uniform action of the carbon moving and control means.

I have utilized a spring motor for moving the carbons together, though this is not limitative on the invention considered in its broader aspects, said motor preferably being wound during the spreading-apart of the holders. There is a solenoid-actuated brake for controlling the speed at which the carbons are moved together, this solenoid being in series with the carbons, and its magnetomotive force therefore varying with changes in the carbon circuit as brought about by variations in the arc-length. As the magnetomotive force changes the brake is actuated to have varying braking effect on the spring motor, the arrangement being such that the brake allows only such approaching movement of the holders as will maintain the arc at given length and brilliancy.

As a particular feature, though this is not limitative on the invention, the brake controlled solenoid also acts to move the holders apart against the action of the spring and thus to strike the arc, the arc-striking mechanism being free from the motor mechanism and hence from the carbons both before and after striking. The solenoid preferably is not effective to actuate the brake mechanism until after the arc is struck, as will be made apparent.

I have provided novel holder-clamps for gripping the carbons, one of their chief features being that they allow the quick, easy replacement of the carbons without the use of tools and without necessitating the operator touching "hot parts", as is true of usual lights. Another feature of the device is the arrangement whereby the carbons may be released from their holders by means actuated from without the housing, but only after the holders have been spread substantially fully apart. Therefore, while it is possible to replace the carbons before the holders are fully spread, it is so much easier to replace them after full spread that the operators naturally spread them full apart. This condition, in effect, insures that the operator will "trim" with full length carbons rather than being tempted to use relatively short carbons and thereby reducing the burning time period below normal.

I have so devised one of the holders that the same member which is actuated to spread the two holders apart against the action of the spring is also adapted to release the carbons from that holder and then to retain the holders in spread-apart condition against the action of the spring motor until the trim has been accomplished. It thus takes but one continuous movement on the part of the operator to spread the holders, release the carbons from one holder and releasably retain the holders in spread condition.

While my invention may well be embodied in lights employing but a single arc, it is found a matter of current economy to utilize two arcs in a single light, this doubling-up also enhancing the illumination value. However, the provision of two carbon pairs to give the two arcs, sets up certain conditions which must be met to render automatic feed of the carbons feasible. For instance, it is necessary that the carbons of the two pairs be in contact at the time the circuit is otherwise closed by the control switch, in order that the circuit may be closed through the carbons so the arc may be struck. Now if the carbons of the two pairs were of different aggregate length and no compensation were provided for this variation, it will be seen that the longer pair of carbons would hold the shorter pair apart, thus maintaining a broken circuit and preventing illumination.

To compensate for this variation in length, I have mounted one carbon of each pair on an equalizing or parallel linkage whereby the carbons are capable of parallel, relative longitudinal movement in opposite directions so that both may come into end contact with their companion carbons even though they be of different lengths, within reasonable limits. If the two carbon pairs burn unevenly, as soon as the circuit is broken, either intentionally or unintentionally, as the holders approach one another under the action of the spring motor the equalizer shifts to allow the carbons of each pair to contact with one another in spite of their variational length, thus closing the circuit through the carbons to cause an automatic striking of the arcs if the circuit be otherwise closed or, if the switch be open, upon the next switch-closing operation, to complete the circuit.

Lack of proper ventilation has been an almost universal characteristic of prior lamps, and this condition has resulted in poor illumination efficiency, both from the standpoint of flickering or weaving arcs, and by reason of accumulation of the glass of the products of combustion of the carbons. The deposit is in the nature of a white powder which not only reduces the illuminating efficiency of the light and necessitates frequent cleaning operations, but also has a tendency to pit the glass, to obvious disadvantage.

To overcome this condition I have provided for the efficient ventilation of the housing, the products of combustion being carried out of the illuminant compartment and into a trap from which it may be readily removed at such times as the light may be idle. The ventilation is also accomplished without cross drafts which would otherwise tend to cause flame flickering, and, to the same end, entering air currents are effectively broken up or dissipated before they reach the illuminant compartment. I have provided certain director or baffle members both for the purpose of breaking up inrushing currents and for directing the draft toward the trap compartment in order that practically all products of combustion may be carried thereto; and as a further feature, certain of said baffles and directing walls of the housing are also so positioned as to reflect heat to the crater end of the positive carbon, to obvious advantage.

At this point it may be stated that I prefer to utilize relatively small diameter negative carbons and relatively large diameter positive carbons, though this is in no way limitative on the invention, considered in its broader aspects, the concentrated discharge resulting giving the stable arc characteristic of crater-forming carbons, in contradistinction to the weaving characteristics of the flaming arc.

Also as a preferred arrangement, though not a limitative one, the carbons are inclined with respect to the axis or line of light projection from the illuminant compartment, the carbons of each pair being in axial alinement. This arrangement has several points of advantage as regards the feeding and striking of the carbons, illuminating efficiency, and disposition of parts so that the natural draft is competent to carry away and properly dispose of the products of combustion. By virtue of their axial alinement, it is rendered more easily possible to provide a relatively simple mechanism for feeding and striking the carbons, this being in contradistinction to the relative difficulty of automatically feeding and striking arcs where the carbons are angularly disposed with respect to one another. The inclination allows the disposition of the holders and feeding mechanism out of vertical alinement with the arc, hence presenting no interfering structure to the upward, natural draft which carries away products of carbon combustion. The holders and slide mechanism are thus not exposed to direct heat from the arc, nor are the products of combustion deposited thereon. The inclination also exposes a part of the crater or lower end of the upper carbons so they are in line with the axis of light projection and thus more effective as illuminants.

The upper, larger carbons are normally consumed faster than are the lower, negative carbons, and since the negative and positive are moved towards one another at uniform speed, it follows that the arc slowly moves longitudinally toward the upper holder or rear of the housing, it being understood that preferably the positive carbons are initially longer than the negative and that all the carbons are chosen to have such characteristics that they will have burned down to approximately equal lengths by the time retrimming is required. Now while it is not essential that the arc be maintained at a given point, the nearer it is maintained to a given axis of light projection, the better. With the described inclination of the carbons, the movement of the arc transversely with respect to such an axis is but one component of its total movement, and is so slight, relatively, that it is not objectionable.

Other objects and novel features of the invention will be made apparent in the following detailed description, reference being had to the accompanying drawings, in which:

Fig. 1 is a front elevation of a light embodying my invention;

Fig. 2 is a side elevation of the light, parts of the housing being broken away to expose underlying elements;

Fig. 3 is a plan view of Fig. 2, a part of the housing being broken away;

Fig. 4 is an enlarged, fragmentary section on line 4—4 of Fig. 2.

Fig. 5 is a section on line 5—5 of Fig. 4;

Fig. 6 is a section on line 6—6 of Fig. 5;

Figs. 7 and 8 are views similar to Fig. 2 but showing the light in changed positions;

Fig. 9 is an enlarged section on line 9—9 of Fig. 3;

Fig. 10 is an enlarged fragmentary section on line 10—10 of Fig. 2;

Fig. 11 is a fragmentary section on line 11—11 of Fig. 9;

Fig. 12 is a section on the irregular line 12—12 of Fig. 9;

Fig. 13 is a detached, plan view of the slide mechanism and carbon holders;

Fig. 14 is a section on line 14—14 of Fig. 13, also showing a fragment of the bottom wall of the enclosing housing;

Fig. 15 is a section on line 15—15 of Fig. 14;

Fig. 16 is a view similar to Fig. 14 except that the carbon holders are moved to different positions, and certain parts are shown in elevation;

Fig. 17 is a view similar to Fig. 13 but showing the carbon holders in different positions;

Fig. 18 is a section on line 18—18 of Fig. 16;

Fig. 19 is a section on line 19—19 of Fig. 16, but showing the carbon-holding clamps moved to release position;

Fig. 20 is an enlarged section on line 20—20 of Fig. 19;

Fig. 21 is a section on line 21—21 of Fig. 13;

Fig. 22 is a wiring diagram;

Fig. 23 is a top plan view of the carbon-moving mechanism, said mechanism being viewed from the position of line 23—23 in Fig. 9;

Fig. 24 is a side elevation of Fig. 23;

Fig. 25 is a section on line 25—25 of Fig. 24;

Fig. 26 is a section on line 26—26 of Fig. 24;

Fig. 27 is a view of Fig. 24 as viewed from the right thereof;

Figure 28:
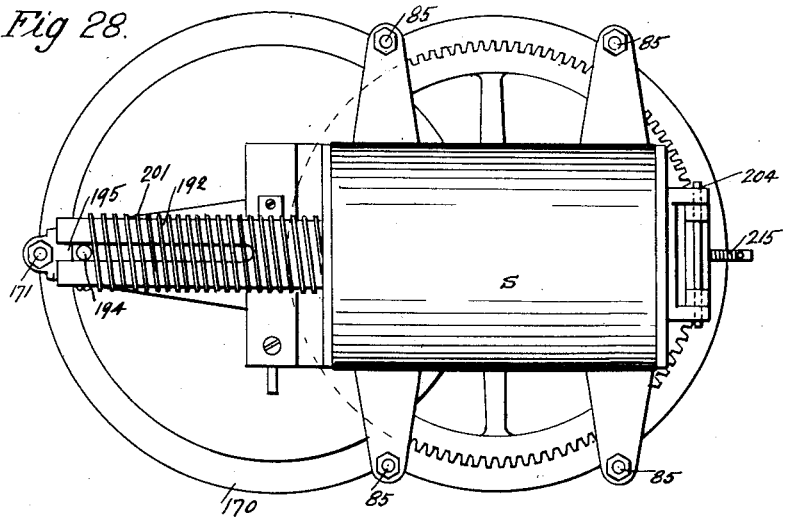
Fig. 28 is a bottom, plan view of Fig. 24.

I will describe with considerable particularity my preferred form of housing structure as well as my preferred form of feed, but while these preferred forms work particularly well together towards the production of a highly efficient arc light, it will be understood that they are novel in themselves and capable of being embodied with complementary structures other than that shown. Therefore, only such claims as are specific to the particular combination are to be considered as limited thereto.

As mentioned above, I have shown the source of illumination as a pair of arcs, and will describe a feeding mechanism especially adapted to a light having double carbons, but it is to be remembered that only such claims as are specific to the double carbons are to be considered as limited thereto, for it will be apparent to those skilled in the art that certain of the novel features herein set forth are as well adapted to a single pair of carbons and the feeding thereof as to the two-pair type.

I will first describe the make-up of my preferred housing structure in order that I may relatively locate the various elements of the carbon holding and feeding mechanism, etc., but will delay detailed discussion of the features of said structure until after the detailed description of the mechanism, at which time the functions of the various elements of the housing structure may be more readily pointed out.

The enclosing structure 10 of my lamp is made up of an illuminant housing 11 defining illuminant compartment $11^a$, carriage or holder housing 12 defining holder compartment $12^a$, slide housing 13 defining slide compartment $13^a$, and control mechanism housing 14 defining control mechanism compartment $14^a$; each of these compartments having communication with one another in a manner to be made apparent hereinafter.

Illuminant housing 11 is made up of top, bottom and side walls 15, 16 and 17, respectively, converging rearwardly towards throat 18 which opens to holder compartment $12^a$, side walls 17 preferably curving smoothly towards the throat opening as in Fig. 3, for purposes which will be made apparent later. The inner faces of the compartment defining walls may be surfaced to have superior reflective qualities, though this is not essential to the successful operation of the light.

Top wall 15 is cut away near throat 18 to provide a relatively large mouth 19 which opens to trap compartment 20. Compartment 20 is defined by an arcuate top or dome 21 hingedly mounted on rod 22 (Fig. 9) held along the upper edge of top wall 15 by bead 23. Preferably, dome 21 extends from front to rear of top wall 15 and is integral with or connected to a movable section 24 of said top wall, dome 21 and section 24 curving at their junction about rod 22 to form a hinge mounting for the trap assembly. Preferably, wall 15 has upturned, arcuate flanges 25 at each side of section 24 and opening 19, while dome 21 has down-turned flanges 26 which are spaced horizontally from flanges 25 (Fig. 12) the last-named flanges stopping short of dome-top 21.

The central part of the free edge of top 21 is preferably bent transversely to provide a transverse flange 27, said flange engaging the upper wall of housing 12, to which it may be releasably secured by screw 28. It will later be made apparent that the natural draft carries the products of combustion of the carbons through mouth 19 into trap 20, it being observed that the air passed into said trap is free to escape to the atmosphere between flanges 25 and 26. When occasion arises for cleaning the deposit from trap 20, the dome and section 24 may be rotated as one into the dotted line position of Fig. 2, so the interior of the trap is readily accessible for cleaning. The dome and section may also be rotated to the dotted line position in order that the arc and certain parts of the mechanism may be observed and adjusted when the light is in such position as prevents such observation or adjustment from the front of the light, as for instance, when the light is suspended from over-head platforms.

The forward edges of side walls 17 and bottom 16 are turned to provide a way 29 for receiving glass panel 30, said glass being lowered into position from above the housing. Bottom 16 is centrally cut through in line with throat 18 to provide a channel central passageway 31, the edges of the bottom wall being turned down at each side of the cut to provide depending flanges 32 (Fig. 12).

Slide housing 13 is of box-like formation, being made up of integral bottom and side walls 33 and 34, respectively, top plates 35, and end plates 36 and 37. Bottom plate 33 is centrally cut back from end plate 37 to provide a slot 38 (Figs. 9 and 15) for a purpose to be described, while end plate 36 is provided with holes 39 (Fig. 1) whereby the lower negative carbons N and N' may be punched from their holders (to be described) and replaced without moving glass 30.

Preferably, though not necessarily, there are two rows of ventilating holes in each side plate 34, the row of upper holes 40 being opposite depending flanges 32, and the row of lower holes 41 being beneath plates 35 (Fig. 10). Side walls 34 have transverse marginal flanges 42 whereby attachment is made at 43 to bottom wall 16; walls 34 and flanges 32 being spaced apart. Plates 35 form a partial dividing wall between compartments 11ª and 13ª, they preferably being of channel cross-section as clearly shown in Fig. 12 and being disposed with opposed flanges 44 spaced apart to define a central, longitudinally extending way 45. The outer flanges 46 of plates 35 preferably engage side walls 34, and the plates are terminally held in spaced and, preferably, in substantially parallel relation with bottom wall 33 by flanges 47 and 48 to which they are secured and which, in turn, are fastened to removable end plates 36 and 37, respectively. It will also be apparent that plates 35 form dividing walls between slide compartment 13ª and holder compartment 12ª.

While housing 13 may extend substantially parallel to the bottom wall 16, I prefer to position it at a slight angle therewith, so the negative carbons may be initially positioned with their upper ends well above wall 16, while their lower ends are in line with and adjacent to punch-out openings 39 in end wall 36, it hence being possible to replace carbons without raising glass 30. The inclination of housing 13 or slide compartment 13ª, is not of great importance in itself, though it has certain features of advantage, the inclination being provided mainly for the purpose of receiving properly the carbon holding and slide mechanism generally designated at 49 and which preferably is inclined with respect to the line or axis A of projection of arc-produced light from compartment 11ª. While this angle is not critical, I find that an angle of about 45° with respect to said axis or, expressed otherwise, with respect to the plane of glass 30, gives uniformly good results, and with the carbon holding and slide mechanism at such an angle, it is convenient that the slide housing be inclined at the same angle, for reasons that are obvious.

The bottom wall 33 of housing 13 has a circular and substantially centrally arranged opening 50, this opening being adapted to take an element of the carbon moving mechanism generally designated at 51, the bottom wall 33 of housing 13 forming the top wall of compartment 14ª which is otherwise defined by the box-like housing 14 secured to said bottom wall at 52.

Housing 12 is made up of parts 53 and 54, part 53 being secured to side walls 17 and 34 at 55; and part 54, which includes an end wall 56, being hingedly connected to part 53 at 57, so said part 54 may be swung to the dotted line position of Fig. 2 in order to give access to compartment 12ª, to clear the way for replacement of carbons in the upper carbon holder, and to allow dismounting of the slide mechanism.

The forward end of top wall 2 of housing 12 is turned upwardly to provide an angular flange 3, this flange carrying bolts 4 which rigidly support a baffle or director plate 5 in spaced relation therewith, said plate, in effect, closing throat 18 to form a dividing wall between illuminant compartment 11ª and holder compartment 12ª. Baffle plate 5 is substantially rectangular and preferably is made up of material which is a non-conductor of electricity and which has high heat-resisting characteristics. Plate 5 preferably extends upwardly into trap 20 so it is adapted to deflect or direct air currents thereinto, even when the housing is tilted as shown in Figs. 7 and 8, and preferably, though not necessarily, it is at substantially right angles with bottom wall 33. Or it may be considered as extending at substantially right angles with the common axial plane of the negative carbons N and N' and positive carbons P and P', and hence angularly with respect to glass 30.

Heated air from compartment 12ᵃ may pass to trap 20 between plate 5 and flange 3 and thence over the top 6 of the plate, said top being spaced from dome 21. The passageway thus defined is designated by numeral 7 (Fig. 9).

Plate 5 has clearance apertures 8 to take the upper carbons. It will be understood that any suitable material may be used for this baffle plate, but since it is essential that no short circuit occur between carbons P, P', it is convenient to insure insulation by use of baffle material which is a non-conductor. This baffle also serves to prevent the heat of the arc from travelling rearwardly into compartment 12ᵃ and to reflect the heat from the arc onto the carbons adjacent their free ends, to obvious advantage.

While the lamp may be supported in any desired manner, either from above, below or from the sides, I have shown a mounting which is especially well adapted to purposes of more or less universal adjustment, but while this mounting is my preferred construction, I do not wish it to be inferred that my broader claims are limited to this particular embodiment.

Upon the inner faces of side wall 34 are reinforcing straps 58, hinge or pivot pins 59 extending through said walls and straps and pivotally taking the upper extremities of the arms 60 of fork 61. Preferably, in order to provide a proper balance, the projected axes of pins 59 approximately intersect the projected axis of opening 50, the intersection of these axes being approximately at the center of mass of the entire assembly. The cross bar 62 of fork 61 carries a central shaft or pin extension 63 which is adapted to be received in the socket-end 64 or post 65 or some similar supporting structure, shaft 63 preferably having an annular groove 66 to take the retention screw 67 which holds the post and shaft from longitudinal separative movement, and, when loosened slightly, allows the shaft and hence the light to be axially rotated, while, when tightened, frictionally holds said shaft and assembly from such rotation.

I have here shown post 65 adjustably supported in portable stand 68 which carries the usual resistance element generally designated at 69, the particular stand and resistance element here shown making up no part of the present invention. Arms 60 are preferably longer than any distance measured on the housing radially from pins 59, so the fork and housing may be rotated relatively through 360°, the advantage of this feature being self-evident. However, complete rotation is not ordinarily necessary and I therefore provide means for holding the lamp in positions of angular adjustment through only about 240°, though this is in no way considered as being limitative on the invention. For this purpose I have provided an arcuate casting 70 (Figs. 5, 6 and 7) secured to one of the side walls 34 by bolts 71 and having an arcuate guide slot 72 which is struck about the associated pin 59 as a center. Clamp bolt 73 extends through slot 72 and aperture 74, the latter being in one of the fork arms 60. The enlarged head 75 of bolt 73 engages the inner face of casting 70 while the threaded shank extends into bore 76 of clamp nut 77, the latter preferably having a knurled hand grip 78 at one end and engaging at its other end a friction washer 79 which has facial bearing with arm 60. It will be immediately apparent that by loosening nut 76 the lamp may be swung with relation to the fork until screw 73 is at either limit of slot 72, and that by threading said nut upon bolt 73, head 75 and washer 79 are drawn forcibly against casting 70 and arm 60, respectively, to clamp them frictionally in adjusted position.

I will now describe my improved carbon-holder slide-mounting which is generally designated at 49, reference being had especially to Figs. 13 to 20, inclusive. The slide mounting is preferably entirely self-contained and removable bodily from compartment 13ᵃ through the upper end thereof after its anchoring bolts and other interfering mechanism have been removed from its path. The advantage of this feature is self-evident.

A circular, cup-shaped gear-housing 80 carries substantially tangential, tubular bosses 81 and 82, the interior of the housing and the bores of the bosses opening to one another through slots 83 (Figs. 14 and 15). Feet 84 extend from bosses 81 and 82 and are adapted to rest on bottom 33, being detachably secured thereto by bolts 85 in such position that housing 80 is in axial alinement with opening 50. Boss 81 carries at its opposite ends the equi-length tubes 86 and 87, while boss 82 carries the paralleling tubes 88 and 89, these four tubes forming both guides for the carbon holders, and housings for the racks by which the holders are reciprocated.

The upper and lower carbon holders are designated generally at 90 and 91, respectively, holder 90 having a cross or base plate 92 (Figs. 15 and 21) with end portions 93 and 94 projecting oppositely into the longitudinally extending, opposed guide slots 95 in tubes 86 and 88, while the base or cross plate 96 of holder 91 has end portions 97 and 98 which extend oppositely into the longitudinally extending opposed guide slots 99 in tubes 87 and 89. End 94 of plate 92 is secured as at 100 (Figs. 15 and 21) to rack 101 which is housed within and adapted to slide through tubes 88, 89 and boss 82. The end 97 of plate 96 is secured as at 102 (Figs. 15 and 18) to rack 103 which is housed within and longitudinally slidable through tubes 87, 86 and boss 81.

The teeth of both racks 101 and 103 are exposed to the interior of housing 80 through slots 83 and are adapted to be held in mesh with gear 104 (Fig. 9) which projects upwardly through opening 50 from the feeding and control mechanism to be later described. Preferably, bosses 81 and 82 carry flanged, anti-friction rollers 105 adapted to engage the racks in a manner to hold them always in mesh with gear 104.

The initial assembly is such that the racks engage the gear in a manner to hold carriers 90 and 91 always at substantially equal distances from the common axial plane of the gear 104 and rollers 105, and I preferably provide racks 101 and 103 with stop pins 106 and 107, respectively, which are adapted to engage the ends of bosses 82 and 81, respectively, or, in effect, the inner, end walls of slots 95, 99, to limit definitely the extent of holder-movement toward housing 80.

Referring to Figs. 18 to 20, inclusive, it will be seen that base or cross plate 96 is centrally apertured at 108 and carries central, upstanding lugs 109 and 110 at opposite sides of said aperture. The vertical portions 111 and 112 of angular arms 113 and 114 are centrally divided to provide slots 115 and are terminally secured in spaced relation with one another to opposite sides of lugs 109 and 110 by bolts 116 and 117, respectively, being insulated from said lugs and from one another by insulating washers and bushings 118 (Fig. 20). Bolt 116 is insulated from arm 113 but forms a binding post for arm 114; while bolt 117 is insulated from arm 114 and forms a binding post for arm 113.

Arm portions 119 and 120 angle upwardly and outwardly from portions 111 and 112, respectively, and to their upper ends are secured sleeves 121 and 122, respectively, these sleeves being of an inside diameter to take with sliding fit the negative carbons N and N' and support them substantially in axial parallelism with tubes 87, 89.

Pivoted at 123 to the underside of portions 119 and 120 are the clamp ends 124 of clamp levers 125, said levers having vertical portions 126 which lie in slots 115 and vertically extending, horizontally spread portions 127 which extend downwardly through aperture 108 and terminate in heads 128 which support studs 129. These studs carry between them an expansive coil spring 130, the heads and spring being insulated from levers 125 at 131. The ends of spring 130 are tight about studs 129, and the effect of said spring is normally to hold levers 125 yieldingly in such position that clamp ends 124 extend through slots 132 in sleeves 121, 122 into the bore of said sleeves. The spring also tends to limit the spreading apart of heads 128 beyond a predetermined extent.

While any suitable means may be provided for actuating the clamp levers to allow entry or withdrawal of carbons to or from sleeves 121, 122, I have shown a preferred actuating means in Figs. 9, 11 and 12. This means is in the form of a loop 133 of spring wire which lies against bottom wall 33 and has its terminals 134 bent downwardly through transverse slots 135 in said bottom. Secured to terminals 134 are knobs 136 which are preferably of wood or some other suitable material which may be grasped without danger of burning the operator's hands. Nuts 137 and flanges 138 on knobs 136 engage opposite sides of bottom 33 in a manner to hold the loop against movement in the direction of the terminal axes, and in such position that the lower, opposite portions or arms 139 of the loop are in line with heads 128.

The inherent spring tendency of loop 133 is to hold portions 139 and hence knobs 136 spread apart, slots 135 limiting the extent of the spread. When holder 91 is in any position of its longitudinal stroke except between portions 139 of the loop, compression of said loop by manipulation of knobs 136 has no effect on the holder, as will be readily understood. However, when the holder is at or near the extreme outer limit of its travel, heads 128 are in line with loop portions 139, so compression of said loop by squeezing knobs 136 together swings levers 125 about their pivotal axes 123 against the action of spring 130, and clamp ends 124 are thereby swung clear of the sleeve bores (Fig. 19) so carbons held within the sleeves may be freely removed or new carbons may be inserted. As soon as pressure on knobs 136 is relieved, spring 130 acts to spread apart the lower ends of levers 125 and thereby presses clamp ends 124 into clamping engagement with the carbons, the carbons thereafter being frictionally held between the clamp ends and the opposite walls of the sleeve bore.

In replacing the lower carbons it is merely necessary to free the clamps as above described and then thrust the new carbons through holes 39 in end 36 and against the butt ends of the old carbons. Continued movement of the new carbons ejects the burnt carbons from the sleeve, whereupon the new carbons may be thrust forwardly until their butt ends are substantially flush with the lower ends of the sleeves.

The upper holder 90 includes a central, tubular post 140 having a cross-head 141 which is forked at each side of said post to receive and pivotally support at 142 the elongated parallel links 143 of the parallel linkage generally designated at 144. Links 143 pivotally support the parallel cross links 145 which, in turn, rigidly carry the carbon holding or supporting sleeves 146 and 147. It will be seen that the arrangement is such that during pivotal movement of the linkage the sleeves or carbon-taking members are maintained in axial parallelism with the guide-tubes and sleeves 121, 122, and the lengths of links 143 are such that in their average position, sleeves 146 and 147 are substantially in axial alinement with sleeves 121 and 122, respectively. The bores of sleeves 146 and 147 are adapted to take the positive carbons P and P', respectively. Sleeves 146 and 147 are held rigidly to links 143 by nuts 148 threaded on extensions 149 and 150, said sleeves, extensions and nuts being insulated from the cross links at 151. Extensions 149 and 150 provide binding posts for sleeves 146 and 147, respectively.

Midway of sleeves 146 and 147 are the clamp levers 152, said levers being pivotally mounted on the sleeves at 153 and extending through transverse sleeve-slots 154, bringing the arcuate portions 155ª of said levers into the slot. Levers 152 extend inwardly beyond the sleeves and are connected by contractile springs 155 to sleeve-carried brackets 156. The normal tendency of springs 155 is to hold the clamp levers frictionally against carbons within the sleeve bores, it being necessary to elevate the inner ends of the levers against the action of the springs to clear them from the sleeve bore so carbons may be inserted in or ejected from the sleeve.

While the clamp levers may be manually and directly elevated when the upper carbons are to be replaced, it is highly desirable that they be actuated by means which may be controlled from without the housing. For this purpose, I have provided a plunger 157 within the bore of post 140, said plunger carrying a head 158 at a point between cross head 141 and levers 152, the head preferably being of a material which is a non-conductor of electricity so it positively cannot form a short between the levers and hence between the carbon-holding sleeves. Or, of course, a metal head may be used if it be properly insulated from said levers.

The lower end of plunger 157 rests upon the top of a slide rod 159 which extends through a slot or notch 160 in the flange 161 depending from base plate 92. This rod has a cross head 162, preferably of circular cross-section, which extends laterally beyond the slot 160, and the rod, itself rests upon and is slidable longitudinally over bottom 33, terminating in a handle 163 at the exterior of the casing.

Rod 159 is normally thrust in until handle 163 is adjacent housing end 37, cross plate 92 being free to slide thereover by virtue of slot 160, and plunger 157 being adapted to slide over the top face of the rod during longitudinal movement of holder 90. When occasion arises for retrimming the carbons, rod 159 is drawn straight outwardly, bringing cross head 162 into contact with flange 161 so withdrawal movement of the rod pulls the holder to the rear of the housing, at the same time acting through the racks and central gear 104 to move the lower holder towards the opposite end of the housing and also to cause certain movements of the feeding mechanism, as will later be made apparent. When the rod has been withdrawn sufficiently to bring cross head 162 over notch 38, though of course the head spans the notch, the rod is rotated about the head as a center and to the position of Fig. 16. This rotation of the rod carries cam end 165 thereof upwardly against plunger 157, serving to elevate said plunger and thereby, through head 158, to rotate the clamping levers against the action of springs 155 so the carbon stubs may be ejected from the sleeve holders by the introduction of new carbons. Of course, the rod cannot be rotated to release the carbon clamps until head 162 is over notch 38, at which time holder 90 is at the upper limit of its stroke. At the same time the rotation of the rod brings it behind shoulder 164 of bottom 33 and the rod then is adapted to hold the carbon carriages from movement toward one another under the action of the means (to be described) tending so to move them.

While it will be understood that both the upper and lower carbons may be released by manipulation of the various clamping levers when the carriages are in positions other than at their points of extreme separation, the means hereby provided for releasing them are only operative when the holders are at said extreme points, and since said means are operable from without the housing and do not require the use of tools or gloves, the operator normally will wish to take advantage of this feature and therefore will fully spread the holders before trimming the carbons, thus insuring "full trims." I have pointed out in the forepart of this specification the desirability of full trims and therefore will not discuss this matter here.

It will be noted that partition plates or channels 35 extend over the slide mechanism, protecting said mechanism in large measure from the heat generated by the arcs. Post 140 of holder 90, and portions 111 and 112 of holder 91 extend upwardly through way 45, the carbons and carbon holding sleeves being disposed over the channels 35. When the carbon stubs are ejected from the sleeves, they fall upon channels 35, rather than upon any of the slide mechanism, and gravitate to the lower end of the lamp where they are in a position for easy removal by lifting glass 30. The wire 166 which is shown diagrammatically in Fig. 22 as extending from the binding post on sleeve 147 to the binding post on sleeve 121, preferably is carried down through way 45 and extends beneath channels 35, thus being protected both from the action of heat and from falling carbons. Wire 166 is long enough, of course, to reach between holders when they are at their outermost limits of travel, and is flexible enough to gather within compartment 13ª as the holders approach one another.

Preferably, end spacers 167 are secured to the free ends of the several guide tubes to tie them together, these spacers being removable, however, so the holders and racks may be assembled with the guide tubes. Threaded studs 168 on spacers 167 are adapted to extend through end walls 36 and 37, and take nuts 169 whereby the terminals of the slide assembly are held to housing 13.

I will now describe my improved means for feeding and striking the carbons, this means preferably being housing within compartment 14ª and thus effectively protected from heat generated within compartment 11ª.

My feeding mechanism may be generally described as a spring motor operatively connected to the carbon holders and normally tending to move them together, a brake mechanism for controlling such movement and thus holding the carbons at proper distance to give an arc of predetermined extent, and electro-magnet means for actuating the brake, the actuating means being responsive to variations set up in the lighting circuit by virtue of carbon consumption and consequent lengthening of the arc and subsequent feed of the carbons and consequent shortening of the arc. I have here shown my feeding, control and brake-actuating means applied to carbon holders which are both movable bodily, but it will be understood said means may be applied with equal advantage to lights wherein only one of the carbon holders is mounted for movement.

While this is not limitative on the invention, considered in its broader aspects, I have utilized the brake actuating magnet for actuating the arc-striking mechanism, the arrangement being such that the magnet does not function in its brake-actuating capacity until it has completed its arc-striking action. Thus, the magnet acts selectively to move the carbons apart and to actuate the brake whereby approaching movement of the carbons is controlled. The advantage of providing a single magnet having such dual function is self-evident.

Secured by bolts 85 to the underside of bottom 33 is upper plate 170, and held by bolts 85 and 171 in spaced relation to the upper plate is a lower plate 172 which has angular brackets 173 and 174 supporting solenoid S. Journaled at 175 in upper plate 170 is a shaft 176, the lower end of the shaft carrying gear 177 at a point below plate 170, and the upper extremity of the shaft carrying the previously mentioned gear 104. Plate 170 is held to bottom 33 in such position that gear 104 may be thrust upwardly through opening 50 and into housing 80, at which point it engages racks 101 and 103.

Between plate 170 and gear 177 shaft 176 passes through circular housing 178 which has an internal, annular flange 179 by which attachment is made through screws 180 to plate 170. A cover plate 181 has a depending annular flange 182 which fits within the housing, screw 183 serving to hold the cup-like cover plate detachably in position and against axial rotation within the housing. Plate 181 also provides bearing at 184 for shaft 176.

An expansive spiral spring 185 is secured at one end 186 to flange 182 and at the other end 187 to shaft 176. Spring 185 is so arranged that counterclockwise movement of gear 104, as viewed in Fig. 23, tends to wind the spring, or expressed otherwise, when spring 185 is wound, it tends to rotate gear 104 in a clockwise direction. With racks 101 and 103 in mesh with gear 104, it follows that when the carbon holders are spread apart, racks 101 and 103 act through said gear to wind the spring, and that the spring therefore tends normally to rotate the gear in a manner to act on the racks to draw said carriages together. At time of assembly, spring 185 is preferably initially put under some tension so it has ample power to draw the carriages together as they approach their innermost positions.

Shaft 188 extends between and is journaled in plates 170 and 172 and carries both the relatively large brake or control wheel or disk 189 and pinion 190, said pinion being in mesh with gear 177. Shaft 188 also carries a pinion 191 at a point below plate 172, this pinion forming one of the connective elements, under certain situations, between the spring motor and solenoid S.

The bore defining tube 192 of solenoid S carries movable core or armature 193, the latter having a cross pin 194 which extends through both tube slots 195 and carries at its upper end a slide block 196, set screw 197 forming a detachable connection between the pin and block, it being understood that the opposite ends of the pin is held rigidly by the movable core. Slide block 196 has a key portion 198 which is adapted to slide longitudinally through the slot 199 in plate 172, the end wall 200 (Fig. 30) of said slot serving as a stop to limit movement of the block and hence of the solenoid in one direction. Preferably, though not necessarily, an expansive coil spring 201 encircles tube 192 between bracket 173 and pin 194, the effect of this spring being to press the movable core yieldably to its limit of extended movement.

Figure 31:
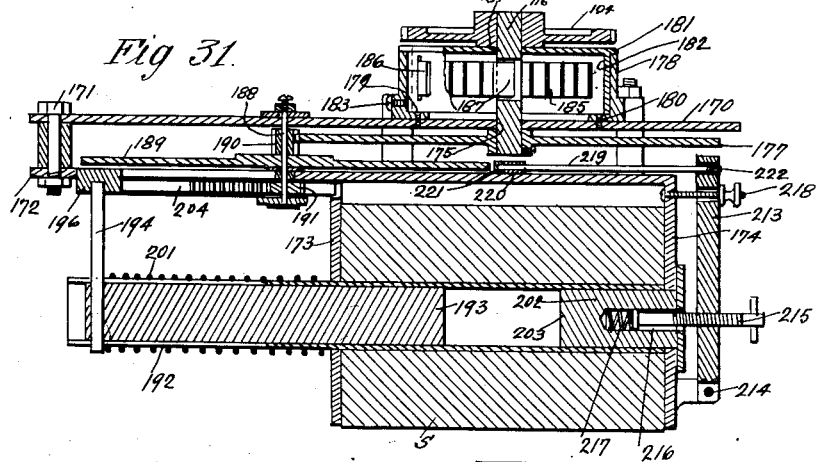
Fig. 31 is a section on line 31—31 of Fig. 23.
Figure 32:
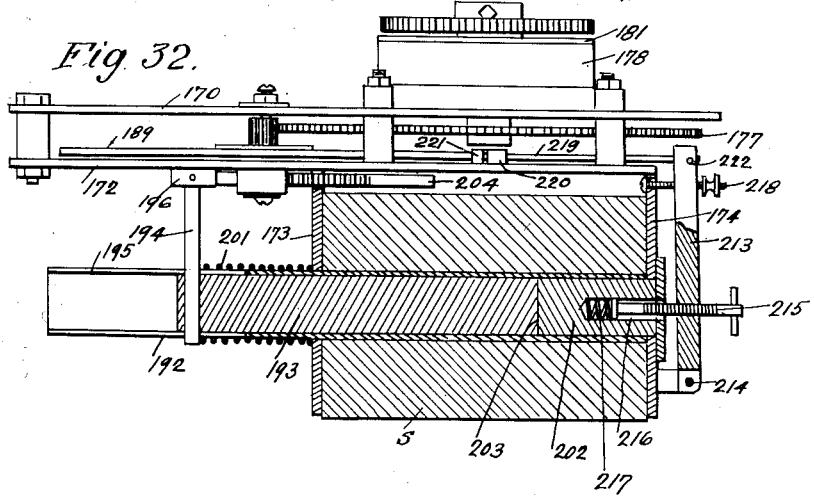
Fig. 32 is a view similar to Fig. 31 but showing the parts in changed relative positions.

At the opposite end of solenoid S is a stationary core 202, the inner end 203 thereof establishing the limit of inward movement of movable core 193, Figs. 31 and 32 showing the movable plunger or core at the opposite ends of its stroke.

Mounted somewhat loosely on set screw 197 or, in effect, on slide block 196 and movable longitudinally with the movable plunger, is a rack arm 204 having a limited extent of teeth 205. Arm 204 is capable of slight movement pivotally about an axis parallel to that of pinion 191, but is yieldably held in engagement with pinion 191 by a plunger 206 mounted in bore 207 of cross-block 208; expansive spring 209 being interposed between said plunger and a plug 210 held within said bore. Plug 210 is movable longitudinally through bore 207 to adjust the effective tension of the spring and may be releasably held in adjusted position by set screw 211.

Figure 29:
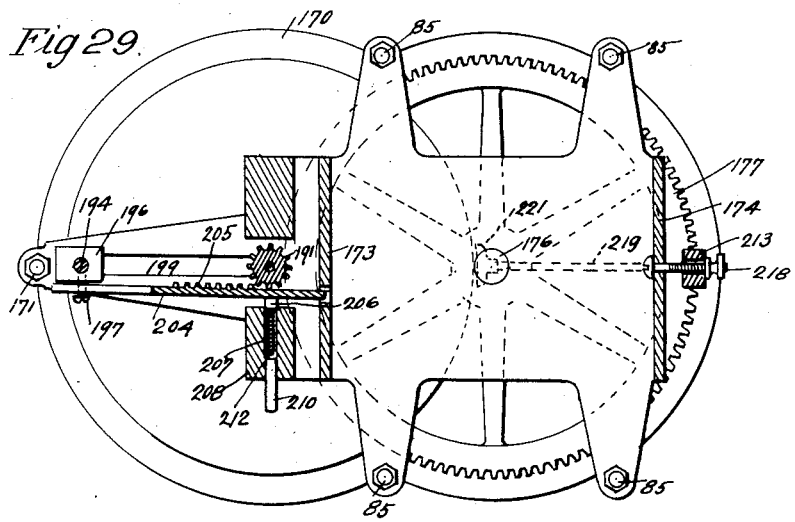
Fig. 29 is a section on line 29—29 of Fig. 24.
Figure 30:
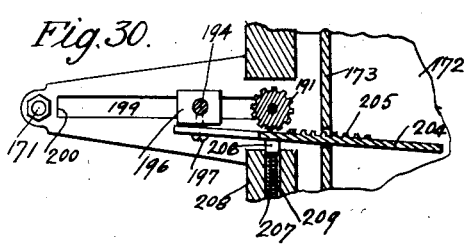
Fig. 30 is a fragmentary view similar to Fig. 29 but showing the parts in changed relative positions.

Reference to Fig. 29 and Fig. 30 will show that when the movable core is at the extreme ends of its stroke, pinion 191 does not engage rack teeth 205, but that slight longitudinal movement of the core from either of these positions moves teeth 205 into mesh with the pinion, the pivotal mounting of arm 204 allowing sufficient movement thereof to prevent binding action in the event the rack teeth do not properly engage the pinion teeth as the rack arm is moved toward said pinion in either direction. Plunger 206 has an extension 212 which normally is spaced from plug 210, but said extension strikes said plug before arm 204 can be swung to such a position that teeth 205 could fully clear the pinion teeth so, if they do not engage properly at first, and the rack is moved back against spring 209, it is insured that there will be enough tooth engagement to allow proper meshing after slight relative movement of the pinion and rack arm.

A swinging armature 213 is pivoted to bracket 174 at 214 and carries a threaded adjustment screw 215 which extends into the axial bore 216 of stationary core 202, there being a spring 217 within said bore which acts yieldably against the screw in a manner to press the armature away from the end of core 202. An adjustable nut and bolt connection 218 between armature 213 and bracket 174 limits the extent to which the armature may be swung under the influence of the spring. A brake rod 219 is mounted for longitudinal sliding movement through a block 220 on plate 172 and preferably, though not necessarily, carries at its forward end a brake shoe 221 which is in the plane of brake disk 189. The disk and shoe may be of any suitable material, as, for instance, aluminum. The opposite extremity of rod 219 has pivotal connection at 222 with swinging armature 213, and the adjustment is such that when said armature is in the position of Fig. 31 the brake shoe does not effectively engage the brake disk, but movement of the swinging armature to the left into the position of Fig. 32 moves the brake shoe into frictional engagement with the disk, the braking effect of the shoe on the disk varying as the force applied to the rod by armature 213 varies.

Fig. 22 is a wiring diagram showing the preferred circuiting employed. Assuming the carbons are in contact the circuit is as follows: source or battery B, switch 223, wire 224, sleeve 122, carbon N', carbon P', sleeve 147, wire 166, sleeve 121, carbon N, carbon P, wire 225, solenoid S and wire 226 to battery or source; it being noted that the solenoid is in series with the carbon.

In describing the operation of the mechanism it will be helpful to consider the parts in the position of Fig. 9, at which time the carbon holders are as close together as they may come and it therefore being necessary to replace the carbons. It will, of course, be assumed that at this time the circuit is broken at switch 223. The operator grasps the handle 163 of rod 159 and draws it back to spread the carbon carriages as previously described. During this movement, gear 104 is rotated in a clockwise or spring-winding direction by the racks; gears 177, 190 and 191 together with disk 189 being rotated simultaneously. However, since core 193 is fully extended, and spring 201 insures full extension when no current is flowing through the solenoid, rack teeth 205 are clear of pinion 191 so no movement of the rack arm or movable core is effected by virtue of this gear movement. When the carbon carriages are fully spread and held in spread position by the previously described swinging of rod 159 to the position of Fig. 16, the upper and lower carbons are replaced in the manner described. The spring 185 is, of course, at this time fully wound. Arm 159 is then swung back to a position of parallelism with the carbons and gradually let forward so spring 185 acting through gear 104 and the racks draws the carbon holders together until the carbons touch, there still being no separative connection between pinion 191 and rack teeth 205 during the approaching movement of the holders. As soon as the carbons engage one another, rod 159 may be thrust forwardly into the position of Fig. 9, holder 90 thereafter traveling over it.

At this point it may be noted that it is necessary to operation that the positive and negative carbons engage in order to complete the circuit and allow a subsequent striking of the arc. Were the carbon pairs to be of different aggregate length and their connection with both holders rigid, it will be seen there would be a gap between the carbons of the shorter pair which would keep the circuit open. Yet it is not desirable that the apparatus require absolutely accurate adjustment of carbons to insure such contact, and the parallel linkage 144 thus comes into play. It will be seen that should two of the carbons engage before the other two due to irregularities in length, the linkage acts in a manner to compensate these irregularities, within reasonable limits, and to allow both sets of carbons to touch, thus insuring a closed circuit when switch 223 is subsequently closed. Such a condition is illustrated in somewhat exaggerated form in Fig. 17, it being understood that carbons will be ordinarily chosen of proper length and are so easily inserted in the holders to be of equal effective length that links 143 normally will be approximately square with respect to the longitudinal axis of the slide assembly. Of course, should the carbons burn unevenly, each time the circuit is broken and the carbons thus brought into end contact, the parallel linkage will compensate for irregularities in length and insure carbon contact.

Assuming now that switch 223 be closed to complete the circuit, it will be seen that solenoid S is energized and movable core 193 thus drawn towards stationary core 202. However, until the two cores meet, the stationary core has not sufficient effective magnetic force to draw armature 213 against the action of spring 217, and consequently brake shoe 221 remains clear of disc 189 and rotation of the latter is not resisted. As core 193 is drawn to the right (Fig. 32) pin 194 and block 196 draw arm 204 to the right and engage teeth 205 with pinion 191. Consequently, continued movement of the core to the right causes rotation of the gear train as long as the rack is in engagement with the pinion, this gear train operation turning shaft 176 in a spring winding direction, and, through gear 104 and racks 101 and 103, spreading the carbon holders apart in a manner to strike the arc. The rack and gear ratio is such that full movement of arm 204 to the right moves the carbon holders apart to separate the carbons to a predetermined extent, giving the proper length of arc.

Plunger 193, of course, continues to move to the right until pinion 191 just clears rack 205, at which time core 193 contacts with stationary core 202. This contacting of cores increases the magnetic force of core 202 to such an extent that it draws armature 213 to the left against the action of spring 217 (of course, screw 215 provides means for adjusting the effective tension of spring 217 and therefore causes armature 213 to react with varying degrees of responsiveness to a given force of magnetic attraction) and rod 219 is thus thrust to the left to bring brake shoe or movement checking member 221 into braking or movement checking engagement with disk 189, holding the gear train from being rotated by spring 185 after rack 205 and pinion 191 pass out of operative engagement and thereby holding the carbon holders from being moved together, or in effect, holding the carbons at a predetermined extent of separation. The rack 205 and pinion 191 now being out of operative engagement, it will be seen that subsequent movement of the gear train in no way effects said rack or core 193.

As the carbons burn away, the length of the arc is gradually increased and the amperage drops to lessen the magnetomotive force of core 202, the armature 213 consequently swinging a minute distance to the right and somewhat relieving the braking pressure on disk 189. Consequently, the gear train is released and spring 185 operates on shaft 176 in a manner to feed the carbon holders and carbons together. As the arcs are thus shortened, the amperage increases and the consequent increase in magnetomotive force of core 202 draws armature 213 again to the left and once more imposes sufficient braking force on disk 189 to hold the spring motor from imparting additional advancing movement to the carbon carriages. This condition of intermittently relieving the brake on the gear train continues throughout the period during which switch 223 is closed, although in actual practice the feed is so smooth and gradual that it apparently is continuous.

At this point it may be noted that the two carriages and their carbons are preferably so proportioned that they almost exactly balance one another, it following that throughout their movement and irrespective of the position to which the housing may be swung, the structure is so balanced that neither carriage has a tendency to overspeed or unduly retard shaft 176, and consequently the force applied to the friction disk is smooth and even, it following that uniform braking force exerted thereagainst by the shoe gives uniform braking effect, a feature of great advantage from the standpoint of even feed and hence a steady, even arc.

Assuming the circuit to be broken by switch 223 or over-burning of one set of carbons, the subsequent de-energization of solenoid S immediately allows spring 217 to move brake shoe 221 to release position, whereupon the spring 185 is free to feed the carbons into contact, the parallel linkage insuring this contact as explained above, and thus causing an automatic "strike" in the event the control switch remains closed. Also upon de-energization of the solenoid, spring 201 moves rack 205 into operative engagement with pinion 191, springs 185 and 201 then acting together to return the core 193 to extended position, spring 201 continuing the movement of the core to such an extent that rack 205 is dis-engaged from pinion 191. The mechanism is then returned to such a position that subsequent closing of the circuit causes the striking movement of plunger 193, as described above. Of course, spring 201 is not essential to the operation of the device when it is so positioned that core 193 is movable by gravity towards extended position.

It is preferable, though not necessary, that the positive carbons P and P' be larger than the negative carbons N and N' so craters are formed in the positive carbons, thus giving the stable arc characteristic of such an arrangement. Since the positive carbons burn faster than do the negatives, said positives will ordinarily be initially longer than the negatives, but the carbons are so chosen that they are burned to equal length by the time the holders arrive approximately at the limit of their approaching movement.

The inclination of the carbons with respect to the axis A presents the positive craters substantially at the axis A, to obvious advantage, and with the mechanism arranged in the illustrated relation with respect to the illuminant housing, it will be seen that the arcs lie beneath opening 19 and the natural upward draft (properly directed by baffle 5) will carry the products of combustion into trap 20 whether the lamp be in the positions of Fig. 7, 8 or 9, or intermediate positions, to the advantageous ends mentioned above.

It will be noted that the carbons lie directly over channels 35, so air currents which enter compartments 13ª through lower openings 41 are directed upwardly through way 45 and towards trap 20 instead of against the carbons. Also, such currents as enter upper openings 41 are broken up by flanges 32 and thus prevented from affecting the arcs. The natural draft caused by the arcs thus tends to dispose of the products of combustion in such a way as to prevent deposit of such products on the housing walls or glass front, to obvious advantage, and the breaking up of air currents and the protection of the arcs from such currents does much to insure a steady, even arc.

The smooth shaping of the illuminant housing walls and their effect in directing currents towards baffle 5 and throat 18 with subsequent exhaust through the trap, prevents the formation of cross currents which might otherwise affect the arc and cause it to flicker or weave.

It will be understood the drawings and description are to be considered merely as illustrative of and not restrictive on the broader claims appended hereto, for various changes in design, structure and arrangement may be made without departing from the spirit and scope of said claims.

I claim:

1. In an arc light, a pair of carbon holders, means for moving one of the holders towards the other holder, said means embodying a shaft operatively connected to said one holder and a spring applied to the shaft in a manner to rotate it in a direction to move said one holder towards the other, a brake disc operatively connected to the shaft, a solenoid, means adapted to energize said solenoid to vary its magnetomotive force, a core in said solenoid, a movable armature opposed to the core, said solenoid through its core being adapted upon its initial energization to move said one holder away from the other holder a predetermined distance against the action of said spring, and a brake operatively associated with said disk and connected to said armature in a manner whereby movement of the armature under the influence of the variational magnetomotive force of the solenoid applies the brake to the disk with variational braking force.

2. In an arc light, a pair of carbon holders, means for moving one of the holders towards the other holder, said means embodying a shaft operatively connected to said one holder and a spring applied to the shaft in a manner to rotate it in a direction to move said one holder towards the other, a brake disk operatively connected to the shaft, a solenoid, means adapted to energize said solenoid to vary its magnetomotive force, a core in said solenoid, a movable armature opposed to the core, said solenoid being adapted upon its initial energization to move said one holder away from the other holder a predetermined distance against the action of said spring, and a brake operatively associated with said disk and connected to said armature in a manner whereby movement of the armature under the influence of the variational magnetomotive force of the solenoid applies the brake to the disk with variational braking force; said core being effective to move the armature into brake applying position only after said holder has been moved said predetermined distance.

3. In an arc light, a pair of carbon holders, means for moving one of the holders towards the other holder, said means embodying a shaft operatively connected to said one holder and a spring applied to the shaft in a manner to rotate it in a direction to move said one holder towards the other, a brake disk operatively connected to the shaft, a solenoid, means adapted to energize said solenoid to vary its magnetomotive force, a stationary core at one end of the solenoid, a movable core at the other end of the solenoid adapted to engage the stationary core when the solenoid is energized, means connected to the movable core adapted to move said holder a predetermined distance away from the other holder when the solenoid is initially energized, and a brake operatively associated with the disk and adapted to be applied thereto by virtue of solenoid energization after said movable core engages the stationary core.

4. In an arc light, a pair of carbon holders, means for moving one of the holders towards the other holder, said means embodying a shaft operatively connected to said one holder and a spring applied to the shaft in a manner to rotate it in a direction to move said one holder towards the other, a brake disk operatively connected to the shaft, a solenoid, means adapted to energize said solenoid to vary its magnetomotive force, a stationary core at one end of the solenoid, a movable core at the other end of the solenoid, means connected to the movable core adapted to move said holder a predetermined distance away from the other holder when the solenoid is initially energized, an armature mounted for pivotal movement towards and away from the stationary core, a brake operatively associated with said disk and connected to said armature in a manner whereby movement of the armature towards the stationary core under the influence of the magnetomotive force of the solenoid applies the brake to the disk, and a spring adapted to resist pivotal movement of the armature towards the core.

5. In an arc light, a pair of carbon holders, means for moving one of the holders towards the other holder, said means embodying a shaft operatively connected to said one holder and a spring applied to the shaft in a manner to rotate it in a direction to move said one holder towards the other, a brake disk operatively connected to the shaft, a solenoid, means adapted to energize said solenoid to vary its magnetomotive force, a stationary core at one end of the solenoid, and a movable core at the other end of the solenoid adapted to engage the stationary core when the solenoid is energized, means connected to the movable core adapted to move said holder a predetermined distance away from the other holder when the solenoid is initially energized, an armature mounted for pivotal movement towards and away from the stationary core, a brake operatively associated with said disk and connected to said armature in a manner whereby movement of the armature towards the stationary core under the influence of the magnetomotive force of the solenoid applies the brake to the disk, and a spring adapted to resist pivotal movement of the armature towards the core; said stationary core being effective to swing the armature towards it only after the movable core engages the stationary core.

6. In an arc light, a pair of carbon holders, means for moving one of the holders towards the other holder, said means embodying a shaft operatively connected to said one holder and a spring applied to the shaft in a manner to rotate it in a direction to move said one holder towards the other, a solenoid, a longitudinally movable core for said solenoid, means for energizing the solenoid, means for limiting the stroke of said core, and means connecting the core and shaft only when the core is away from its stroke limits whereby movement of the core by virtue of energization of said solenoid rotates said shaft against the action of said spring.

7. In an arc light, a pair of carbon holders, means for moving one of the holders towards the other holder, said means embodying a shaft operatively connected to said one holder and a spring applied to the shaft in a manner to rotate it in a direction to move said one holder towards the other, a solenoid, a longitudinally movable core for said solenoid, means for energizing the solenoid, means for limiting the stroke of said core, means connecting the core and shaft only when the core is away from its stroke limits whereby movement of the core by virtue of energization of said solenoid rotates said shaft against the action of said spring, and means adapted to act with varying effective force to resist movement of said shaft in its spring-urged direction when the core is at one of its stroke limits.

8. In an arc light, a pair of carbon holders, means for moving one of the holders towards the other holder, said means embodying a shaft operatively connected to said one holder and a spring applied to the shaft in a manner to rotate it in a direction to move said one holder towards the other, a solenoid, a longitudinally movable core for said solenoid, means for energizing the solenoid, means for limiting the stroke of said core, means connecting the core and shaft only when the core is away from its stroke limits whereby movement of the core by virtue of energization of said solenoid rotates said shaft against the action of said spring, and means operated by said solenoid and adapted to act with varying effective force to resist movement of said shaft in its spring-urged direction when the core is at one of its stroke limits.

9. In an arc light, a pair of carbon holders, means for moving one of the holders towards the other holder, said means embodying a shaft operatively connected to said one holder and a spring applied to the shaft in a manner to rotate it in a direction to move said one holder towards the other, a solenoid, a longitudinally movable core for said solenoid, means for energizing the solenoid, means for limiting the stroke of said core, means connecting the core and shaft only when the core is away from its stroke limits whereby movement of the core by virtue of energization of said solenoid rotates said shaft against the action of said spring, and means adapted to move the core in the opposite direction when the solenoid is de-energized.

10. In an arc light, a pair of carbon holders, means for moving one of the holders towards the other holder, said means embodying a shaft operatively connected to said one holder and a spring applied to the shaft in a manner to rotate it in a direction to move said one holder towards the other, a solenoid, a longitudinally movable core for said solenoid, means for energizing the solenoid, means for limiting the stroke of said core, means connecting the core and shaft only when the core is away from its stroke limits whereby movement of the core by virtue of energization of said solenoid rotates said shaft against the action of said spring, and a spring adapted to move the core in the opposite direction when the solenoid is de-energized.

11. In an arc light, a pair of carbon holders mounted for movement towards and away from each other between given limits, means for moving the holders, a releasable carbon-clamp on one of said holders, and means operable to release said clamp only when said one holder is approximately at a given position in its path of movement.

12. In an arc light, a pair of carbon holders mounted for movement towards and away from each other between given limits, means for moving the holders, releasable carbon-clamps, one on each holder, and means operable to release said clamps only when the holders are approximately at given positions with respect to their limits of movement.

13. In an arc light, a pair of carbon holders mounted for movement towards and away from each other between given limits, means for moving the holders, a releasable carbon-clamp on one of said holders, and means operable to release said clamp only when the holder is approximately at one of its limits of movement.

14. In an arc light, a pair of carbon holders mounted for movement towards and away from each other between given limits, means for moving the holders, releasable carbon-clamps, one on each holder, and means operable to release said clamps only when the holders are approximately at one of their limits of movement.

15. In an arc light, a pair of carbon holders, one of said holders being movable towards and away from the other holder, a releasable carbon-clamp on said one holder, and unitary means operable to move said one holder in one direction and to release said clamp.

16. In an arc light, a pair of carbon holders, one of said holders being movable towards and away from the other holder, a releasable carbon-clamp on said one holder, and unitary means selectively operable to move said one holder in one direction and to release said clamp.

17. In an arc light, a pair of carbon holders, one of said holders being movable towards and away from the other holder, a releasable carbon-clamp on said one holder, and unitary means operable to move said one holder in one direction, to release said clamp and to hold said holder releasably against movement in the opposite direction.

18. In an arc light, a pair of carbon holders, each holder being adapted to support a pair of carbons in side by side relation, means for clamping the carbons in the holders, the carbons of a given pair being in axial alinement, one each, with the carbons of the other pair, the carbons of one holder being mounted for simultaneous, oppositely directed and substantially parallel longitudinal movement while clamped in said holder and while they remain axially parallel to the carbons of the other holder.

19. In an arc light, a carbon holder embodying a head, a parallel linkage pivotally supported by the head, and a pair of axially parallel carbons mounted on said linkage in a manner whereby pivotal movement of the linkage moves said carbons simultaneously and oppositely in the directions of their axes.

20. In an arc light, an illuminant housing, a pair of arc-forming carbons in said housing, a slide-mounting for one of the carbons, said slide-mounting being disposed below the illuminant housing, a housing for said slide mounting, said housing having ventilation apertures, and ventilation passageways between the illuminant and slide-mounting housings, said passageways being out of alinement with the carbons.

21. In an arc light, a housing, a carbon holder movable bodily through the housing, a releasable carbon clamp on the holder, said holder embodying a supporting member, a clamp lever pivotally mounted on the supporting member for pivotal movement into and out of clamping position, spring means adapted to hold said lever yieldably and normally in clamping position, and actuating means accessible at the exterior of the housing and adapted to be actuated only when said holder is at a predetermined position in its path of movement to move said lever out of clamping position.

22. In an arc light, a pair of carbon holders, means for moving one of the holders towards the other holder, said means embodying a shaft operatively connected to said one holder and a spring applied to the shaft in a manner to rotate it in a direction to move said one holder towards the other, a control wheel operatively connected to the shaft, a solenoid, means adapted to energize said solenoid to vary its magnetomotive force, a stationary core at one end of the solenoid, a movable core at the other end of the solenoid adapted to engage the stationary core when the solenoid is energized, means connected to the movable core adapted to move said holder a predetermined distance away from the other holder when the solenoid is initially energized, and a movement-checking member operatively associated with the wheel and adapted to be applied thereto to check movement thereof by virtue of solenoid energization after said movable core engages the stationary core.

23. In an arc light, a pair of carbon holders, means for moving one of the holders towards the other holder, said means embodying a shaft operatively connected to said one holder and a spring applied to the shaft in a manner to rotate it in a direction to move said one holder towards the other, a control wheel operatively connected to the shaft, a solenoid, means adapted to energize said solenoid to vary its magnetomotive force, a stationary core at one end of the solenoid, a movable core at the other end of the solenoid, means connected to the movable core adapted to move said holder a predetermined distance away from the other holder when the solenoid is initially energized, an armature mounted for pivotal movement towards and away from the stationary core, a movement-checking member operatively associated with said wheel and connected to said armature in a manner whereby movement of the armature towards the stationary core under the influence of the magnetomotive force of the solenoid applies the movement-checking member to the wheel to check movement thereof, and a spring adapted to resist pivotal movement of the armature towards the core.

24. In an arc light, a pair of carbon holders, means for moving one of the holders towards the other holder, said means embodying a shaft operatively connected to said one holder and a spring applied to the shaft in a manner to rotate it in a direction to move said one holder towards the other, a control wheel operatively connected to the shaft, a solenoid, means adapted to energize said solenoid to vary its magnetomotive force, a stationary core at one end of the solenoid, and a movable core at the other end of the solenoid adapted to engage the stationary core when the solenoid is energized, means connected to the movable core adapted to move said holder a predetermined distance away from the other holder when the solenoid is initially energized, an armature mounted for pivotal movement towards and away from the stationary core, a movement-checking member operatively associated with the wheel and connected to said armature in a manner whereby movement of the armature towards the stationary core under the influence of the magnetomotive force of the solenoid applies said movement-checking member to the wheel to check movement thereof, and a spring adapted to resist pivotal movement of the armature towards the core; said stationary core being effective to swing the armature towards it only after the movable core engages the stationary core.

25. In an arc light, a pair of carbon holders, means for moving one of the holders towards the other holder, said means embodying a shaft operatively connected to said one holder and a spring applied to the shaft in a manner to rotate it in a direction to move said one holder towards the other, an electromagnet, means adapted to energize said electromagnet to vary its magnetomotive force, a movable armature for the electromagnet, means yieldably holding the armature near one position, means connected to the armature and adapted to move said one holder a predetermined distance from the other holder when the armature is moved from said one position to a predetermined position by initial energization of the electromagnet, and means operable by virtue of variations in the magnetomotive force of the electromagnet, after the armature has been moved to said predetermined position and without movement of said armature towards said one position, to control subsequent movement of said one holder towards the other holder under the influence of said first-mentioned means.

26. In an arc light, a carbon holder embodying a head, a link pivotally mounted on the head and extending beyond opposite sides of the pivotal mounting, carbon-taking members pivotally connected to the link at opposite sides of said pivotal mounting, and means applied to said members adapted to hold them in substantially parallel relation during pivotal movement of the link.

27. In an arc light, a pair of carbon holders, means for moving one of the holders towards the other holder, said means embodying a shaft operatively connected to said one holder and a spring applied to the shaft in a manner to rotate it in a direction to move said one holder towards the other, an electromagnet, a movable armature for the magnet, means for energizing the magnet, means for limiting the stroke of said armature, and means connecting the armature and shaft only when the armature is away from its stroke limits whereby movement of the armature by virtue of energization of said magnet rotates said shaft against the action of said spring.

28. In an arc light, a carbon holder embodying a supporting member, a link pivotally mounted on the member and extending beyond opposite sides of the pivotal mounting, carbon-taking members pivotally connected to the link at opposite sides of said pivotal mounting, and means applied to said carbon-taking members to control their movement during pivotal movement of the link.

In witness that I claim the foregoing I have hereunto subscribed my name this 28th day of October, 1926.

ERNEST G. ASHCRAFT.